United States Patent
Kotani et al.

(10) Patent No.: US 12,202,977 B2
(45) Date of Patent: Jan. 21, 2025

(54) RUBBER COMPOSITION AND TIRE

(71) Applicant: BRIDGESTONE CORPORATION, Tokyo (JP)

(72) Inventors: Kyohei Kotani, Tokyo (JP); Takafumi Asakura, Tokyo (JP); Yasuhiro Shoda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 463 days.

(21) Appl. No.: 17/634,157

(22) PCT Filed: Aug. 20, 2020

(86) PCT No.: PCT/JP2020/031524
§ 371 (c)(1),
(2) Date: Feb. 9, 2022

(87) PCT Pub. No.: WO2021/039602
PCT Pub. Date: Mar. 4, 2021

(65) Prior Publication Data
US 2022/0289950 A1    Sep. 15, 2022

(30) Foreign Application Priority Data

Aug. 28, 2019 (JP) .................................. 2019-156152
Aug. 28, 2019 (JP) .................................. 2019-156160

(51) Int. Cl.
| | |
|---|---|
| *B60C 1/00* | (2006.01) |
| *C08F 236/08* | (2006.01) |
| *C08K 3/04* | (2006.01) |
| *C08L 7/00* | (2006.01) |
| *C08L 9/00* | (2006.01) |

(52) U.S. Cl.
CPC ............. *C08L 9/00* (2013.01); *B60C 1/0016* (2013.01); *C08F 236/08* (2013.01); *C08K 3/04* (2013.01); *C08L 7/00* (2013.01); *C08L 2205/02* (2013.01)

(58) Field of Classification Search
CPC ..... C08L 9/00; C08L 7/00; C08K 3/04; C08F 236/08; B60C 1/00
USPC ....................................................... 523/156
See application file for complete search history.

(56) References Cited

U.S. PATENT DOCUMENTS

| | | | |
|---|---|---|---|
| 5,919,875 A | 7/1999 | Luo et al. | |
| 8,695,663 B2 | 4/2014 | Zhao | |
| 9,512,305 B2 | 12/2016 | Ishino | |
| 2001/0036899 A1 | 11/2001 | Luo | |
| 2002/0156210 A1 | 10/2002 | Luo | |
| 2003/0166802 A1 | 9/2003 | Luo | |
| 2005/0147685 A1 | 7/2005 | Osada et al. | |
| 2014/0155539 A1* | 6/2014 | Ishino ................. B60C 1/00 524/526 |
| 2016/0340477 A1 | 11/2016 | Takahashi | |

FOREIGN PATENT DOCUMENTS

| | | |
|---|---|---|
| CN | 103849014 A | 6/2014 |
| EP | 2 740 758 A1 | 6/2014 |
| EP | 4 023 459 A1 | 7/2022 |
| EP | 4 163 124 A1 | 4/2023 |
| JP | 06-306207 A | 1/1994 |
| JP | 06-087975 A | 3/1994 |
| JP | 06-92108 A | 4/1994 |
| JP | 06-199103 A | 7/1994 |
| JP | 07-025212 A | 1/1995 |
| JP | 7-188461 A | 7/1995 |
| JP | 2000-119324 A | 4/2000 |
| JP | 2004-528410 A | 9/2004 |
| JP | 2005-518467 A | 6/2005 |
| JP | 2005-527641 A | 9/2005 |
| JP | 2006-063183 A | 3/2006 |
| JP | 2009-108330 A | 5/2009 |
| JP | 2013-136745 A | 7/2013 |
| JP | 2014-084410 A | 5/2014 |
| JP | 2014-109019 A | 6/2014 |
| JP | 2015-120804 A | 7/2015 |
| JP | 2016-60789 A | 4/2016 |
| JP | 2016-216626 A | 12/2016 |
| JP | 2018-095703 A | 6/2018 |
| JP | 2019-59826 A | 4/2019 |
| JP | 2021-95661 A | 6/2021 |
| WO | 03/018644 A1 | 3/2003 |
| WO | 03/093337 A1 | 11/2003 |

OTHER PUBLICATIONS

International Preliminary Report on Patentability (with translation of Written Opinion) dated Mar. 1, 2022, issued by the International Bureau in application No. PCT/JP2020/031524.
Extended European Search Report dated Sep. 5, 2023 in Application No. 20856224.9.
International Search Report for PCT/JP2020/031524 dated Oct. 20, 2020 [PC/ISA/210].
Search Report dated Feb. 7, 2023, in Chinese Application No. 202080060775.1.

* cited by examiner

*Primary Examiner* — Deve V Hall
(74) *Attorney, Agent, or Firm* — Sughrue Mion, PLLC

(57) ABSTRACT

Provided is rubber composition that can improve wear resistance and cutting resistance while having good fuel efficiency when applied to a tire. The rubber composition contains a rubber component containing natural rubber and/or synthetic isoprene rubber, and syndiotactic 1,2-polybutadiene, where the syndiotactic 1,2-polybutadiene has a crystal content of 7 J/g to 40 J/g and a number-average molecular weight of $6.5 \times 10^4$ or more.

19 Claims, No Drawings

RUBBER COMPOSITION AND TIRE

CROSS REFERENCE TO RELATED APPLICATIONS

This application is a National Stage of International Application No. PCT/JP2020/031524 filed Aug. 20, 2020, claiming priority based on Japanese Patent Application No. 2019-156152 filed Aug. 28, 2019 and Japanese Patent Application No. 2019-156160 filed Aug. 28, 2019

TECHNICAL FIELD

This disclosure relates to a rubber composition and a tire.

BACKGROUND

Generally, a rubber composition used for producing a rubber product such as a tire is required to have high durability such as high cutting resistance. However, diene-based rubbers such as butadiene rubber (BR) and styrene-butadiene rubber (SBR), which have been frequently used in the rubber industry, have a problem that they do not have sufficient breaking resistance, especially cutting resistance, under high strain input. Under such circumstances, various rubber components and rubber compositions have been developed.

To improve the durability of a rubber composition, for example, a semi-interpenetrating network hydrogel or interpenetrating network hydrogel, that is, a high-strength gel of double network gel has been developed, as described in WO/2003/093337 (PTL 1), where a second monomer component is introduced into a network structure formed by polymerizing and cross-linking a first monomer component, and the second monomer component is polymerized and optionally cross-linked to obtain a semi-interpenetrating network hydrogel or interpenetrating network hydrogel, and in the semi-interpenetrating network hydrogel or interpenetrating network hydrogel, 10 mol % or more of the first monomer component is an unsaturated monomer with an electric charge, 60 mol % or more of the second monomer component is an unsaturated monomer that is electrically neutral, a molar ratio of first monomer component content:second monomer component content is 1:2 to 1:100, and when the second monomer component is polymerized and cross-linked, the degree of cross-linking is smaller than that when the first monomer component is polymerized and cross-linked.

CITATION LIST

Patent Literature

PTL 1: WO/2003/093337

SUMMARY

Technical Problem

It could thus be helpful to provide a rubber composition that can improve wear resistance and cutting resistance while having good fuel efficiency when applied to a tire. Further, it could be helpful to provide a tire having excellent fuel efficiency, wear resistance and cutting resistance.

Solution to Problem

To solve the above problem, we have repeatedly studied a rubber composition containing a rubber component containing natural rubber and/or synthetic isoprene rubber and syndiotactic 1,2-polybutadiene. As a result, we came up with an idea that the cutting resistance of a rubber composition is significantly improved by applying a concept of double network to the rubber composition. As a result of further diligent research, we found that, by optimizing the crystal content and molecular weight of the syndiotactic 1,2-polybutadiene, the wear resistance and cutting resistance can be improved while maintaining good fuel efficiency, thereby completing the present disclosure.

Furthermore, we found that, even in a case where the double network is not formed in the process, the cutting resistance of the rubber component containing natural rubber and/or synthetic isoprene rubber can be improved by adding the syndiotactic 1,2-polybutadiene.

We thus provide the following.

The rubber composition of the present disclosure contains a rubber component containing either or both of natural rubber and synthetic isoprene rubber, and syndiotactic 1,2-polybutadiene, where the syndiotactic 1,2-polybutadiene has a crystal content of 7 J/g to 40 J/g and a number-average molecular weight of $6.5 \times 10^4$ or more.

By having the above configuration, it is possible to improve the wear resistance and cutting resistance while having good fuel efficiency when applied to a tire.

For the rubber composition of the present disclosure, the syndiotactic 1,2-polybutadiene preferably has a crystal content of 15 J/g to 40 J/g and a number-average molecular weight of $8.9 \times 10^4$ or more, more preferably has a crystal content of 17 J/g to 40 J/g and a number-average molecular weight of $17.9 \times 10^4$ or more, and particularly preferably has a crystal content of 17 J/g to 31 J/g and a number-average molecular weight of $17.9 \times 10^4$ to $34.7 \times 10^4$. In this case, both the fuel efficiency and the wear resistance and cutting resistance when applied to a tire can be achieved at a higher level.

For the rubber composition of the present disclosure, the content of the syndiotactic 1,2-polybutadiene is preferably 10 parts by mass to 30 parts by mass with respect to 100 parts by mass of the rubber component. In this case, both the fuel efficiency and the wear resistance and cutting resistance when applied to a tire can be achieved at a higher level.

For the rubber composition of the present disclosure, the melting point of the syndiotactic 1,2-polybutadiene is preferably 100° C. to 180° C. In this case, both the fuel efficiency and the wear resistance and cutting resistance when applied to a tire can be achieved at a higher level.

For the rubber composition of the present disclosure, the 1,2-bond content of the syndiotactic 1,2-polybutadiene is preferably 80 mass % or more. In this case, both the fuel efficiency and the wear resistance and cutting resistance when applied to a tire can be achieved at a higher level.

The rubber composition of the present disclosure preferably further contains a filler, where the filler more preferably contains at least carbon black, and the content of the carbon black is still more preferably 10 parts by mass to 70 parts by mass with respect to 100 parts by mass of the rubber component. In this case, the wear resistance and cutting resistance of the rubber composition can be further improved.

It may be a rubber composition containing carbon black but no silica.

For the rubber composition of the present disclosure, the modulus value at 25% elongation (M25), the modulus value at 300% elongation (M300) and the modulus value at 400% elongation (M400) after vulcanization preferably satisfy the following relational expressions (1) and (2) and more preferably satisfy the following relational expression (3).

$$M400-M300 \leq 5.80 \quad (1)$$

$$M25 \times M300/(M400-M300)^2 > 0.39 \quad (2)$$

$$M25/(M400-M300)^2 > 0.04 \quad (3)$$

The tire of the present disclosure uses the above-described rubber composition of the present disclosure.

By having the above configuration, it is possible to improve the fuel efficiency, wear resistance and cutting resistance.

Further, in the tire of the present disclosure, the rubber composition is preferably used at least as a member of a tread portion that is in contact with a road surface. In this case, the fuel efficiency, wear resistance and cutting resistance can be further improved.

Advantageous Effect

According to the present disclosure, it is possible to provide a rubber composition that can improve wear resistance and cutting resistance while having good fuel efficiency when applied to a tire. Further, according to the present disclosure, it is possible to provide a tire having excellent fuel efficiency, wear resistance and cutting resistance.

DETAILED DESCRIPTION

The following describes an embodiment of the rubber composition and the tire of the present disclosure.

<Rubber Composition>

The rubber composition of the present disclosure contains a rubber component containing natural rubber and/or synthetic isoprene rubber, and syndiotactic 1,2-polybutadiene, where
the syndiotactic 1,2-polybutadiene has a crystal content of 7 J/g to 40 J/g and a number-average molecular weight of $6.5 \times 10^4$ or more.

The rubber composition of the present disclosure preferably has a structure in which syndiotactic 1,2-polybutadiene (hereinafter, it may be referred to as "sPB") forms a three-dimensional mesh network in a rubber component matrix of natural rubber or synthetic isoprene rubber after vulcanization, that is, a so-called double network structure. The sPB is a crystalline polymer where the crystal is sacrificed and destroyed under high strain to obtain an effect of dissipating input energy, and the sPB is compatible with natural rubber and synthetic isoprene rubber. Therefore, it is possible to partially immobilize the sPB in the rubber component containing natural rubber and synthetic isoprene rubber and to form a three-dimensional network (double network) containing a sPB crystal portion and a rubber component/sPB compatible portion in a vulcanized rubber.

Because of the double network structure, a high energy dissipation effect caused by the sPB crystal portion and flexibility caused by the rubber component/sPB compatible portion can be obtained. Therefore, the rubber composition of the present disclosure can achieve excellent wear resistance and cutting resistance. Further, in the rubber composition of the present disclosure, the sPB has high crystallinity and a large molecular weight, so that crystal collapse does not occur at the input of low strain that contributes to rolling resistance. Furthermore, the rubber composition of the present disclosure has a larger molecular weight and less terminal chain movement than other general-purpose resins, so that deterioration of fuel efficiency can be suppressed.

(Rubber Component)

The rubber composition of the present disclosure contains natural rubber (NR) and/or synthetic isoprene rubber (IR) as a rubber component. When the rubber component contains one or more of natural rubber and synthetic isoprene rubber, the above-described double network of sPB is formed in the rubber composition after vulcanization. As a result, when the rubber component is applied to a tire, it is possible to improve wear resistance and cutting resistance while obtaining good fuel efficiency.

The natural rubber (NR) and synthetic isoprene rubber (IR) use isoprene as a monomer and a cis-1,4-polyisoprene structure as a main component. The natural rubber may be derived from rubber tree or other plant resources. The isoprene monomer for synthesizing the synthetic isoprene rubber may be isoprene derived from petroleum or biomass.

In the rubber composition of the present disclosure, the natural rubber and synthetic isoprene rubber usually account for 100% of the rubber component, but other rubbers may be contained in a small amount as long as the effects of the present disclosure are not impaired.

(Syndiotactic 1,2-Polybutadiene)

The rubber composition of the present disclosure contains syndiotactic 1,2-polybutadiene (sPB) having a crystal content of 7 J/g to 40 J/g and a number-average molecular weight of $6.5 \times 10^4$ or more. By containing the sPB together with the natural rubber and/or synthetic isoprene rubber, the above-described double network can be formed in the rubber composition after vulcanization, and it is possible to improve the wear resistance and cutting resistance while obtaining good fuel efficiency when applied to a tire.

The crystal content of the syndiotactic 1,2-polybutadiene is 7 J/g to 40 J/g. This is because, by setting the crystal content of the sPB to 7 J/g or more, the above-described double network can be more reliably formed in the rubber composition after vulcanization, and the fuel efficiency, wear resistance and cutting resistance can be further improved when applied to a tire. From the same viewpoint, the crystal content of the sPB is preferably 15 J/g or more and more preferably 17 J/g or more. On the other hand, when the crystal content of the sPB is too large, the melting point of the sPB may become too high, rendering it difficult to achieve a vulcanization temperature at which the double network can be formed, or when the crystal content is too large, the breaking elongation of rubber may tend to decrease because the crystal serves as a destruction nucleus. From this viewpoint, it is 40 J/g, preferably 36 J/g or less, and more preferably 31 J/g or less.

The crystal content of the sPB is the amount of heat of melting, and it is an index indicating how much the sPB is crystallized. It can be derived from the melting peak measured by a differential scanning calorimeter.

From the viewpoint of more reliably forming the above-described double network in the rubber composition after vulcanization and further improving the fuel efficiency, wear resistance and cutting resistance when applied to a tire, the number-average molecular weight of the syndiotactic 1,2-polybutadiene needs to be $6.5 \times 10^4$ or more.

From the same viewpoint, the number-average molecular weight of the sPB may be $8.9 \times 10^4$ or more, $10.0 \times 10^4$ or more, $11.0 \times 10^4$ or more, $12.0 \times 10^4$ or more, $13.0 \times 10^4$ or more, $14.0 \times 10^4$ or more, $15.0 \times 10^4$ or more, $16.0 \times 10^4$ or more, $17.0 \times 10^4$ or more, $17.9 \times 10^4$ or more, $18.0 \times 10^4$ or more, $19.0 \times 10^4$ or more, or $20.0 \times 10^4$ or more. On the other hand, the number-average molecular weight of the sPB is preferably $50.0 \times 10^4$ or less from the viewpoint of crack growth resistance and preventing deterioration of ride quality when applied to a tire. From the same viewpoint, the number-average molecular weight of the sPB may be $40.0 \times 10^4$ or less, $39.0 \times 10^4$ or less, $38.0 \times 10^4$ or less, $37.0 \times 10^4$ or less, $36.0 \times 10^4$ or less, $35.0 \times 10^4$ or less, $34.7 \times 10^4$ or less, $34.0 \times 10^4$ or less, $33.0 \times 10^4$ or less, $32.0 \times 10^4$ or less, $31.0 \times 10^4$ or less, or $30.0 \times 10^4$ or less.

In the syndiotactic 1,2-polybutadiene, the amount of 1,2-bond of the sPB (the amount of 1,2-bond in the microstructure of the sPB) is preferably 80 mass % or more and more preferably 85 mass % or more. This is because, in this way, the above-described double network can be more reliably formed in the rubber composition after vulcanization, and the fuel efficiency, wear resistance and cutting resistance when applied to a tire can be further improved. From the same viewpoint, the amount of 1,2-bond of the sPB may be 90 mass % or more, 91 mass % or more, 92 mass % or more, 93 mass % or more, 94 mass % or more, or 95 mass % or more.

In the present disclosure, the amount of 1,2-bond of the sPB can be determined by $^1H$ and $^{13}C$ nuclear magnetic resonance (NMR) analysis.

Further, in the syndiotactic 1,2-polybutadiene, the syndiotacticity in the 1,2-bond of the sPB is preferably 60% or more and more preferably 65% or more. This is because, in this way, the above-described double network can be more reliably formed in the rubber composition after vulcanization, and the fuel efficiency, wear resistance and cutting resistance when applied to a tire can be further improved. From the same viewpoint, the syndiotacticity in the 1,2-bond of the sPB may be 70% or more, 75% or more, 80% or more, 85% or more, 90% or more, 95% or more, or 100%.

In the present disclosure, the syndiotacticity in the 1,2-bond of the sPB can be determined by $^1H$ and $^{13}C$ nuclear magnetic resonance (NMR) analysis.

The syndiotactic 1,2-polybutadiene may be a copolymer obtained by copolymerizing a small amount of conjugated diene such as 1,3-pentadiene and 1-pentyl-1,3-butadiene in addition to 1,3-butadiene, or may be a homopolymer of 1,3-butadiene.

When the sPB contains a unit derived from a conjugated diene other than 1,3-butadiene, the ratio of a unit derived from 1,3-butadiene in all repeating units of the sPB may be 80% or more, 85% or more, 90% or more, 95% or more, 98% or more, or 99% or more in one embodiment.

Although the melting point of the syndiotactic 1,2-polybutadiene is not particularly limited, it is preferably 100° C. to 180° C. from the viewpoint of further improving the wear resistance and cutting resistance of the rubber composition. When the melting point of the sPB is 180° C. or lower, crystallization of the sPB is likely to proceed during vulcanization of the rubber composition, and the above-described double network can be more reliably formed in the rubber composition after vulcanization. From the same viewpoint, the melting point of the sPB may be 170° C. or lower or 160° C. or lower. On the other hand, when the melting point of the sPB is 100° C. or higher, it is possible to suppress the deterioration of heat resistance and strength of the vulcanized rubber. From the same viewpoint, the melting point of the sPB may be 110° C. or higher or 120° C. or higher.

The content of the syndiotactic 1,2-polybutadiene in the rubber composition of the present disclosure is not particularly limited, and it can be appropriately changed depending on the required cutting resistance and other performance. For example, from the viewpoint of further improving the fuel efficiency, wear resistance and cutting resistance when the rubber composition is applied to a tire, the content of the sPB is preferably 10 parts by mass to 30 parts by mass with respect to 100 parts by mass of the rubber component. When the content of the sPB is 10 parts by mass or more with respect to 100 parts by mass of the rubber component, the energy dissipation effect is enhanced, and better wear resistance and cutting resistance can be obtained. From the same viewpoint, the content of the sPB may be 15 parts by mass or more and 20 parts by mass or more with respect to 100 parts by mass of the rubber component. On the other hand, when the content of the sPB is 30 parts by mass or less with respect to 100 parts by mass of the rubber component, deterioration of fuel efficiency can be suppressed.

A method of obtaining the sPB is not particularly limited. You may produce the sPB by yourself or use a commercially available one.

For example, the sPB may be obtained by polymerizing a 1,3-butadiene monomer in an organic solvent containing an aliphatic solvent using an iron-based catalyst composition, a chromium-based catalyst composition, a cobalt-based catalyst composition, or the like. Specifically, it can be prepared with the polymerization methods described in JP 2006-063183 A, JP 2000-119324 A, JP 2004-528410 A, JP 2005-518467 A, JP 2005-527641 A, JP 2009-108330 A, JP H07-25212 A, JP H06-306207 A, JP H06-199103 A, JP H06-92108 A, JP H06-87975 A, or the like.

From the viewpoint that the crystal content of the sPB can be more reliably controlled in the range of 7 J/g to 40 J/g and the number-average molecular weight in the range of $6.5 \times 10^4$ or more, it is preferable to use the iron-based catalyst composition among the above catalyst compositions.

Examples of the iron-based catalyst composition include a catalyst composition obtained by mixing (a) an iron-containing compound, (b) an α-acyl phosphodiester, and (c) an organoaluminum compound; a catalyst composition obtained by mixing (a) an iron-containing compound, (b) an α-acyl phosphodiester, (c) an organoaluminum compound, and other organometallic compounds or Lewis bases; and a catalyst composition containing (a) an iron-containing compound, (b) dihydrocarbyl hydrogen phosphite, and (c) an organoaluminum compound.

The (a) iron-containing compound is not particularly limited, and suitable examples thereof include iron carboxylate, organic iron phosphate, organic iron phosphonate, organic iron phosphinate, iron carbamate, iron dithiocarbamate, iron xanthogenate, iron α-diketonate, iron alkoxide or aryl oxide, and organic iron compounds.

Among these compounds, the iron-based catalyst composition more preferably contains iron tris(2-ethylhexanoate) (III), bis (2-ethylhexyl) phosphite, triisobutylaluminum, tri-n-butylaluminum, and tri-n-octylaluminum from the viewpoint that the crystal content of the sPB can be more reliably controlled in the range of 7 J/g to 40 J/g and the number-average molecular weight in the range of $6.5 \times 10^4$ or more.

Examples of the chromium-based catalyst composition include a three-component catalyst system containing (a) a chromium-containing compound, (b) a hydrogenated alkylaluminum compound, and (c) a hydrogen phosphite ester. The component (a) of the chromium-based catalyst composition of the present disclosure may be various chromium-containing compounds. In general, it is advantageous to use a chromium-containing compound that is soluble in a hydrocarbon solvent such as aromatic hydrocarbon, aliphatic hydrocarbon or alicyclic hydrocarbon. However, an insoluble chromium-containing compound simply dispersed in a polymerization medium can also produce a catalytically active species. Therefore, no limitation should be placed on the chromium-containing compound to ensure the solubility.

Examples of chromium in the (a) chromium-containing compound include, but are not limited to, chromium carboxylate, chromium β-diketonate, chromium alkoxide or allyloxide, halogenated chromium, pseudo-halogenated chromium, and organic chromium compounds.

Examples of the cobalt-based catalyst composition include a catalyst system containing soluble cobalt such as cobalt octoate, cobalt 1-naphthate and cobalt benzoate, an organoaluminum compound such as trimethylaluminum, triethylaluminum, tributylaluminum and triphenylaluminum, and carbon disulfide.

The commercially available sPB may be, for example, JSR RB® (JSR RB is a registered trademark in Japan, other countries, or both) series such as JSR RB® 810, 820, 830, 840 of JSR Corporation.

(Filler)

The rubber composition of the present disclosure preferably further contains a filler in addition to the above-described rubber component and syndiotactic 1,2-polybutadiene.

By containing the filler, both the wear resistance and the cutting resistance of the rubber composition can be achieved at a higher level.

The filler is not particularly limited, and examples thereof include carbon black, silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. It is preferable to contain at least carbon black among the above fillers. These fillers may be used alone or in combination of two or more. For example, the rubber composition may only contain carbon black as the filler.

The content of the filler is, for example, preferably 10 parts by mass to 160 parts by mass, more preferably 15 parts by mass to 140 parts by mass, further 15 parts by mass to 120 parts by mass, and particularly preferably 20 parts by mass to 120 parts by mass with respect to 100 parts by mass of the rubber component. The content of the filler may be 45 parts or more and 55 parts or less.

The carbon black is not particularly limited, and examples thereof include carbon black of SAF, ISAF, IISAF, N339, HAF, FEF, and GPF grade. The nitrogen adsorption specific surface area (measured in accordance with JIS K 6217-2: 2001, $N_2SA$) of the carbon black is preferably 20 $m^2/g$ to 160 $m^2/g$, more preferably 25 $m^2/g$ to 160 $m^2/g$, still more preferably 25 $m^2/g$ to 150 $m^2/g$, and particularly preferably 30 $m^2/g$ to 150 $m^2/g$. The dibutyl phthalate oil absorption of the carbon black (measured in accordance with JIS K 6217-4: 2008, DBP) is preferably 40 ml/100 g to 160 ml/100 g, more preferably 40 ml/100 g to 150 ml/100 g, still more preferably 50 ml/100 g to 150 ml/100 g, further preferably 60 ml/100 g to 150 ml/100 g, and particularly preferably 60 ml/100 g to 140 ml/100 g. The carbon black may be used alone or in combination of two or more.

From the viewpoint of enhancing the reinforcing properties of the rubber composition, the content of the carbon black is preferably 10 parts by mass or more, more preferably 20 parts by mass or more, and particularly preferably 30 parts by mass or more with respect to 100 parts by mass of the rubber component. On the other hand, from the viewpoint of suppressing the deterioration of low loss properties and the deterioration of fuel efficiency, the content of the carbon black is preferably 70 parts by mass or less and more preferably 60 parts by mass or less with respect to 100 parts by mass of the rubber component.

Examples of the silica include wet silica (hydrous silicic acid), dry silica (silicic acid anhydride), calcium silicate, and aluminum silicate, among which wet silica is preferably used.

The BET specific surface area (measured according to ISO 5794/1) of the wet silica is preferably 40 $m^2/g$ to 350 $m^2/g$. Silica having a BET specific surface area in this range has an advantage that it can achieve both rubber reinforcing properties and dispersibility in the rubber component. From this viewpoint, silica having a BET specific surface area in a range of 80 $m^2/g$ to 300 $m^2/g$ is more preferable. Commercially available products such as "Nipsil AQ" and "Nipsil KQ" manufactured by Tosoh Silica Corporation and "Ultrasil VN3" manufactured by Evonik Industries AG can be used as the silica. The silica may be used alone or in combination of two or more.

Although carbon black is contained as the filler, it may be blended without silica. This case is preferable in that the effect of reducing rolling resistance can be further improved.

In the case where silica is used as the filler, the rubber composition before vulcanization preferably further contains a silane coupling agent such as bis (3-triethoxysilylpropyl) polysulfide, bis (3-triethoxysilylpropyl) disulfide, and 3-trimethoxysilylpropylbenzothiadyltetrasulfide. The blending amount of the silane coupling agent in the rubber composition before vulcanization varies depending on the type of the silane coupling agent or the like, but it is preferably selected in a range of 2 parts by mass to 20 parts by mass with respect to 100 parts by mass of the silica.

(Other Component)

In addition to the above-described rubber component, syndiotactic 1,2-polybutadiene and filler, the rubber composition of the present disclosure may appropriately contain other components that are commonly used in the rubber industry, depending on the required performance.

Examples of the other components include a vulcanizing agent (cross-linking agent), a vulcanization accelerator, a vulcanization retarder, an age resistor, a reinforcing agent, a softener, a vulcanizing co-agent, a coloring agent, a flame retardant, a lubricant, a foaming agent, a plasticizer, a processing aid, an antioxidant, an anti-scorch agent, an ultraviolet rays protecting agent, an antistatic agent, an color protecting agent, and an oil, which can be contained in the rubber composition before vulcanization These components may be used alone or in combination of two or more.

In a case of sulfur cross-linking, examples of the vulcanizing agent include sulfur-containing cross-linking agents such as sulfur (powdered sulfur and the like), morpholine/disulfide, and high molecular weight polysulfide. In a case of non-sulfur cross-linking, examples thereof include peroxide cross-linking such as tert-butyl hydroperoxide, 1,1,3,3-tetramethylbutyl hydroperoxide, cumene hydroperoxide, dicumyl peroxide, di-tert-butyl peroxide, diisopropyl benzene hydroperoxide, and tert-butylcumyl peroxide.

Examples of the vulcanization accelerator include a sulfenamide-based vulcanization accelerator, a thiazole-based vulcanization accelerator, a guanidine-based vulcanization accelerator, a thiourea-based vulcanization accelerator, a thiuram-based vulcanization accelerator, a dithiocarbamine-based vulcanization accelerator, and a xanthate-based vulcanization accelerator.

Examples of the co-cross-linking agent in the peroxide cross-linking include ethylene glycol dimethacrylate, trimethylolpropane trimethacrylate, zinc methacrylate, and magnesium methacrylate.

A method of preparing the rubber composition before vulcanization is not particularly limited, and a known method may be used. For example, it may be obtained by adding each component at the same time or in an arbitrary order and kneading the components using a kneader such as a Banbury mixer, a roll, or an internal mixer.

<Method of Producing Vulcanized Rubber Composition>

A method of producing the vulcanized rubber composition of the present disclosure is not particularly limited.

For example, from the viewpoint of reliably forming the above-described double network in the vulcanized rubber composition, it is acceptable to use a production method including a process of, during the preparation of an unvulcanized rubber composition, kneading each component with the temperature at which the syndiotactic 1,2-polybutadiene and the natural rubber and/or synthetic isoprene rubber are kneaded (kneading during which a masterbatch is kneaded) set to a temperature of 10° C. to 100° C. higher than the melting point of the sPB, and a process of vulcanizing the obtained unvulcanized rubber composition at a temperature equal to or higher than the melting point of the sPB.

In the production method, the reason for limiting the temperature during kneading of the sPB and the natural rubber and/or synthetic isoprene rubber is that, by setting the temperature during kneading to 10° C. to 100° C., preferably 10° C. to 50° C., and more preferably 12° C. to 50° C. higher than the melting point of the sPB and performing kneading at this temperature, the sPB can be compatible with the rubber component.

Next, in the production method, it is considered important to perform vulcanization at a temperature equal to or higher than the melting point of the sPB to form a double network. The reason is considered as follows. By vulcanizing the obtained unvulcanized rubber composition at a temperature equal to or higher than the melting point of the sPB, the sPB is partially soluble in the rubber component and is immobilized as a network in the rubber component, thereby forming the above-described double network in the vulcanized rubber composition. However, this does not mean that the double network is not formed at all when vulcanization is performed at a temperature lower than the melting point of the sPB. This is because, even when vulcanization is performed at a temperature lower than the melting point of the sPB, a part of the sPB can be melted to form at least a part of the double network. For example, it is considered that at least a part of the double network can be formed even if the temperature is −15° C. from the melting point or higher but lower than the melting point.

As a result, the obtained vulcanized rubber composition obtains excellent cutting resistance without deteriorating the low heat generating properties.

A method of confirming that the above-described double network has been formed in the vulcanized rubber composition is not particularly limited. For example, by confirming from a phase image of an atomic force microscope (AFM) that the sPB has formed a co-continuous network structure in the natural rubber and/or isoprene rubber which is a matrix polymer, the formation of the double network can be confirmed.

When the sPB and the natural rubber and/or synthetic isoprene rubber are kneaded in the production method (during the kneading in which a masterbatch is kneaded), the sPB can be more reliably compatible with the natural rubber and/or synthetic isoprene rubber if the temperature during kneading reaches a temperature of 10° C. higher than the melting point of the sPB.

On the other hand, when the sPB and the natural rubber and/or synthetic isoprene rubber are kneaded in the production method (during the kneading in which a masterbatch is kneaded), thermal deterioration of the rubber component and the sPB can be suitably prevented if the temperature during kneading is 100° C. higher than the melting point of the sPB or lower, preferably 50° C. higher than the melting point or lower. As a result, it can contribute to improving the cutting resistance of the obtained vulcanized rubber composition.

When the sPB and the natural rubber and/or synthetic isoprene rubber are kneaded in the production method, a kneader such as a Banbury mixer, a roll or an internal mixer can be used.

The temperature during kneading in the production method means the temperature of the masterbatch when the masterbatch of the unvulcanized rubber composition is discharged from the kneader. Specifically, it is a temperature obtained by measuring the internal temperature of the masterbatch immediately after it is discharged from the kneader with a temperature sensor or the like during the kneading of the masterbatch. However, if there is a temperature measuring means for the unvulcanized rubber composition in the kneader, it is acceptable to measure the temperature of the masterbatch at the time of discharging.

As used herein, the masterbatch is a rubber composition obtained in a process where the rubber component and the sPB are kneaded but the cross-linking agent and the vulcanization accelerator are not blended.

The vulcanization temperature in the production method is preferably a temperature equal to or higher than the melting point of the sPB. This is because, when the vulcanization temperature is equal to or higher than the melting point of the sPB, it is thermodynamically difficult to form a domain structure in which the sPB in the rubber component is in a crystalline state, so that the above-described double network can be more reliably formed.

The temperature during vulcanization in the production method is the highest temperature achieved as the vulcanization starts and develops (usually, it is the set temperature of the vulcanization apparatus).

Further, the vulcanization in the production method may use a known vulcanization system, which may be a sulfur vulcanization system or a non-sulfur vulcanization system.

The above-described double network is formed in the rubber composition after vulcanization, and the durability is improved. In addition, it is preferable for the rubber composition after vulcanization that the modulus value at 25% elongation (M25), the modulus value at 300% elongation (M300) and the modulus value at 400% elongation (M400) satisfy the following relational expressions (1) and (2).

$$M400-M300 \leq 5.80 \quad (1)$$

$$M25 \times M300/(M400-M300)^2 > 0.39 \quad (2)$$

There is also a problem that it is difficult to determine whether or not the above-described double network structure has been formed only by the composition of the vulcanized rubber composition or simple observation of the structure. Therefore, it is possible to confirm that the double network structure has been formed when the vulcanized rubber composition contains the natural rubber and/or synthetic isoprene rubber and the sPB and satisfies the relational expressions (1) and (2).

The reason is as follows. When a crystalline material such as sPB is contained in the structure, M25 (MPa) tends to increase. Further, when a part of the sPB is compatible with the rubber component, the elongation crystallinity of the rubber component is inhibited, so that the stress rising rate in a high strain region (300% or more) is reduced, which reduces the value of M400 (MPa)–M300 (MPa). As a result, when the double network structure is formed in the vulcanized rubber composition, the value of M25×M300/(M400–M300)$^2$ is increased.

Therefore, when the vulcanized rubber composition contains a rubber component containing natural rubber and/or synthetic isoprene rubber and sPB and satisfies the relational expressions (1) and (2), the durability such as cutting resistance can be improved without deteriorating the low heat generating properties.

From the same viewpoint, the rubber composition after vulcanization preferably satisfies the following relational expression (3).

$$M25/(M400-M300)^2 > 0.04 \quad (3)$$

<Tire>

The tire of the present disclosure is a tire using the rubber composition of the present disclosure described above.

In this way, the tire of the present disclosure can obtain excellent fuel efficiency, wear resistance and cutting resistance.

The portion of the tire that uses the vulcanized rubber composition of the present disclosure is not particularly limited. For example, the vulcanized rubber composition can be suitably used in a portion such as a tread and a sidewall where high durability (especially wear resistance and cutting resistance) is required.

When used in a tire tread, the entire tread rubber can be formed by the vulcanized rubber composition of the present disclosure. It is also acceptable to use the vulcanized rubber composition of the present disclosure at least in a member of the tread portion that is in contact with a road surface.

The rubber composition of the present disclosure is particularly expected to be applied to tires for truck buses, large tires for mines, and the like. Because the rubber composition has excellent durability, it is particularly expected to be used in tires that are intended for rough roads. As a typical example of such use, the vulcanized rubber composition is not foam rubber.

EXAMPLES

The following describes the present disclosure in more detail with reference to examples, but the present disclosure is not limited to the following examples.

Example 1

Example 1 used the following as syndiotactic 1,2-polybutadiene-1 (hereinafter, may be abbreviated as "SPB-1") to syndiotactic 1,2-polybutadiene-8 (hereinafter, may be abbreviated as "SPB-8").

(sPB-1 and sPB-2)

The sPB-1 was "JSR RB® 840" manufactured by JSR Corporation. The sPB-1 had a 1,2-bond content of 84 mass %, a melting point of 122° C., a number-average molecular weight of $6.6 \times 10^4$, and a crystal content of 21 J/g.

The sPB-2 was "JSR RB® 820" manufactured by JSR Corporation. The sPB-2 had a 1,2-bond content of 86 mass %, a melting point of 95° C., a number-average molecular weight of $8.9 \times 10^4$, and a crystal content of 15 J/g.

(Production of sPB-3 to sPB-7)

A 1 L (1000 CC)-glass bottle that had been dried in an oven was plugged with a rubber liner for sealing and a metal cap with a hole. After the bottle was completely purged with dry nitrogen gas, 94 g of hexanes and 206 g of a mixture of 1,3-butadiene/hexanes containing 21.8 mass % of 1,3-butadiene were added to the bottle.

Next, a catalyst component was added to the bottle under the conditions listed in Table 1.

The bottle was stirred for 4 hours in a water bath maintained at the reaction temperature listed in Table 1. The resulting polymerization reaction mixture was a fluid and slightly turbid solution. The fluidity of the solution disappeared with the precipitation of syndiotactic 1,2-polybutadiene, which occurred immediately after cooling to room temperature. The polymerization reaction mixture was aggregated with 3 liters of isopropanol containing 2,6-di-tert-butyl-4-methylphenol as an antioxidant. The resulting solid content was isolated by filtration and dried under reduced pressure at 60° C. to a constant weight to obtain syndiotactic 1,2-polybutadiene.

(Production of sPB-8)

A 76 L (760000 CC)-stainless steel reactor was completely purged with dry nitrogen gas, and 9764 g of hexanes and 26423 g of a mixture of 1,3-butadiene/hexanes containing 20.6 mass % of 1,3-butadiene were added to the reactor. The temperature inside the reactor was set to 52° C.

Next, a catalyst component was added to the reactor under the conditions listed in Table 1.

The reactor was stirred for one hour at the reaction temperature listed in Table 1. The resulting polymerization reaction mixture was a fluid and slightly turbid solution. The fluidity of the solution disappeared with the precipitation of syndiotactic 1,2-polybutadiene, which occurred immediately after cooling to room temperature. The polymerization reaction mixture was aggregated with 9.5 liters of isopropanol containing 2,6-di-tert-butyl-4-methylphenol as an antioxidant. The resulting solid content was isolated by filtration and dried under reduced pressure at 60° C. to a constant weight to obtain syndiotactic 1,2-polybutadiene.

The melting point, number-average molecular weight (Mn) and crystal content of the sPB-1 to sPB-8 were measured with the following methods, and the measurement results are listed in Table 1.

(Melting Point of Syndiotactic 1,2-Polybutadiene)

A sample of syndiotactic 1,2-polybutadiene was placed in a differential scanning calorimetry (DSC) device and measured with a method in which the melting peak temperature of a DSC curve when the temperature was raised at a heating rate of 10° C./min was used as the melting point.

(Number-Average Molecular Weight (Mn))

It was measured by gel permeation chromatography [GPC: HLC-8220/HT manufactured by Tosoh] using a differential refractometer as a detector, and a polystyrene-equivalent number-average molecular weight was indicated with monodisperse polystyrene as a standard. The column was GMHHR-H(S)HT [manufactured by Tosoh], the eluent was trichlorobenzene, and the measurement temperature was 140° C.

(Crystal Content)

The crystal content (J/g) was obtained by calculating the area of the melting peak observed from −100° C. to 200° C. obtained when the melting point was measured using differential scanning calorimetry (manufactured by TA Instruments).

TABLE 1

|  |  | sPB-3 | sPB-4 | sPB-5 | sPB-6 | sPB-7 | sPB-8 |
|---|---|---|---|---|---|---|---|
| Catalyst component added | Tris (2-ethylhexanoate) iron (III) Fe(EHA)$_3$ |  | 0.04 mmol |  |  | 0.02 mmol | 4.35 mmol |
|  | Bis (2-ethylhexyl) phosphite HP(O)(OEtHex)$_2$ |  | 0.16 mmol |  |  | 0.08 mmol | 17.4 mmol |
|  | Triisobutylaluminum C$_{12}$H$_{27}$A | — | — | 0.24 mmol | — | 0.3 mmol | — |
|  | Tri-n-octylaluminum (C$_8$H$_{17}$)$_3$Al | 0.48 mmol | 0.56 mmol | 0.24 mmol | 0.48 mmol | — | — |
|  | Tri-n-butylaluminum C$_{12}$H$_{27}$A | — | — | — | — | — | 61.0 mmol |
| Reaction temperature (° C.) |  | 50 | 50 | 50 | 65 | 80 | 82 |
| Property of sPB | Number-average molecular weight Mn (×1000) | 273 | 293 | 347 | 336 | 328 | 179 |
|  | Melting point (° C.) | 102 | 103 | 120 | 131 | 173 | 140 |
|  | Crystal content (J/g) | 7 | 18 | 31 | 17 | 36 | 18 |

<Samples 1 to 8 and 10 to 12>

A non-production kneading process was performed with the composition listed in Table 2. The highest temperature during kneading was 150° C. Next, the components listed in Table 2 were added to the masterbatch obtained from the non-production kneading process, and a production vulcanization process was performed to obtain a vulcanized rubber composition. The temperature during vulcanization was 160° C.

<Sample 9>

A non-production kneading process was performed with the composition listed in Table 2. The highest temperature during kneading was 177° C. Next, the components listed in Table 2 were added to the masterbatch obtained from the non-production kneading process, and a production vulcanization process was performed to obtain a vulcanized rubber composition. The temperature during vulcanization was 160° C.

For each of the resulting samples of vulcanized rubber composition, the balance between fuel efficiency and wear resistance and the balance between fuel efficiency and cutting resistance were evaluated with the following methods. The results are listed in Table 2.

(1) Balance Between Fuel Efficiency and Wear Resistance

First, the tangent loss tan δ of each sample of vulcanized rubber composition was measured under conditions of frequency of 15 Hz, tensile strain of 2%, and a temperature of 50° C. using a viscoelasticity meter (manufactured by Ueshima Seisakusho Co., Ltd.). The tan δ was divided by the stress (M50) at room temperature and 50% strain obtained from a tensile test (JIS 7 test piece) raised to the power of 0.4 (tan δ/M50$^{0.4}$) to calculate the evaluation value of fuel efficiency. The evaluation of the fuel efficiency was indicated as an index obtained by taking the reciprocal of the calculated value and taking the reciprocal of the evaluation value of Sample 1 as 100. The larger the index value is, the better the fuel efficiency is.

With respect to the wear resistance, a disc-like test piece (diameter 16.2 mm×thickness 6 mm) was cut out from each sample of vulcanized rubber composition, the test piece was used to conduct a Lambourn wear test according to JIS-K6264-2: 2005, and the amount of wear (mm$^3$) at 40° C. and a slip rate of 25% was measured. The evaluation of the wear resistance was indicated as an index obtained by taking the reciprocal of the measured value and taking the reciprocal of the amount of wear of Sample 1 as 100. The larger the index value is, the better the wear resistance is.

With respect to the balance between fuel efficiency and wear resistance, the evaluation value of fuel efficiency was on the horizontal axis and the amount of wear of wear resistance was on the vertical axis, and the value on a straight line obtained by connecting the plotted points of the results of Samples 1 and 2 was taken as 100. The result of each sample was plotted, and the distance from the straight line (above or below) was indicated as an index. The larger the index value is, the better the wear resistance in terms of fuel efficiency is.

(2) Balance Between Fuel Efficiency and Cutting Resistance

First, the tangent loss tan δ of each sample of vulcanized rubber composition was measured under conditions of frequency of 15 Hz, tensile strain of 2%, and a temperature of 50° C. using a viscoelasticity meter (manufactured by Ueshima Seisakusho Co., Ltd.). The tan δ was divided by the stress (M50) at room temperature and 50% strain obtained from a tensile test (JIS 7 test piece) raised to the power of 0.4 (tan δ/M50$^{04}$) to calculate the evaluation value of fuel efficiency. The evaluation of the fuel efficiency was indicated as an index obtained by taking the reciprocal of the calculated value and taking the reciprocal of the evaluation value of Sample 1 as 100. The larger the index value is, the better the fuel efficiency is.

With respect to the cutting resistance, a test was conducted in which a pure shear-type test piece was cut while being stretched, and the growth of the crack was observed using a tensile test device (Shimadzu Corporation), and the crack growth rate was measured when the common logarithm of the energy release rate was 4.8. The evaluation of the cutting resistance was indicated as an index obtained by taking the crack growth rate of Sample 1 as 100. The larger the index value is, the better the cutting resistance is.

With respect to the balance between fuel efficiency and cutting resistance, the evaluation value of fuel efficiency was on the horizontal axis and the transfer energy of cutting resistance was on the vertical axis, and the value on a straight line obtained by connecting the plotted points of the results of Samples 1 and 2 was taken as 100. The result of each sample was plotted, and the distance from the straight line (above or below) was indicated as an index. The larger the index value is, the better the cutting resistance in terms of fuel efficiency is.

TABLE 2

|  |  | 1 Comparative Example | 2 Comparative Example | 3 Example | 4 Example | 5 Comparative Example | 6 Example |
|---|---|---|---|---|---|---|---|
| Chemical composition of rubber composition | Synthetic isoprene rubber | 100 | 100 | 80 | 80 | 80 | 80 |
|  | sPB-1 | — | — | 20 | — | — | — |
|  | sPB-2 | — | — | — | 20 | — | — |
|  | sPB-3 | — | — | — | — | 20 | — |
|  | sPB-4 | — | — | — | — | — | 20 |
|  | sPB-5 | — | — | — | — | — | — |
|  | sPB-6 | — | — | — | — | — | — |
|  | sPB-7 | — | — | — | — | — | — |
|  | sPB-8 | — | — | — | — | — | — |
|  | Carbon black *1 | 39 | 48.8 | 39 | 39 | 39 | 39 |
|  | Stearic acid | 2 | 2 | 2 | 2 | 2 | 2 |
|  | Wax *2 | 2 | 2 | 2 | 2 | 2 | 2 |
|  | Age resistor 6C *3 | 1 | 1 | 1 | 1 | 1 | 1 |
|  | ZnO | 3.0 | 3.0 | 3.0 | 3.0 | 3.0 | 3.0 |
|  | Sulfur | 1.3 | 1.3 | 1.3 | 1.3 | 1.3 | 1.3 |
|  | Age resistor TMQ *4 | 0.3 | 0.3 | 0.3 | 0.3 | 0.3 | 0.3 |
|  | Vulcanization accelerator *5 | 0.8 | 0.8 | 0.8 | 0.8 | 0.8 | 0.8 |
| Evaluation | Fuel efficiency | 100 | 87 | 114 | 110 | 113 | 120 |
|  | Wear resistance | 100 | 117 | 68 | 81 | 73 | 81 |
|  | Cutting resistance | 100 | 113 | 130 | 115 | 106 | 127 |
|  | Balance between wear resistance and fuel efficiency | 100 | 100 | 82 | 93 | 87 | 108 |
|  | Balance between cutting resistance and fuel efficiency | 100 | 100 | 150 | 141 | 131 | 159 |

|  |  | 7 Example | 8 Example | 9 Example | 10 Example | 11 Example | 12 Example |
|---|---|---|---|---|---|---|---|
| Chemical composition of rubber composition | Synthetic isoprene rubber | 80 | 80 | 80 | 80 | 90 | 70 |
|  | sPB-1 | — | — | — | — | — | — |
|  | sPB-2 | — | — | — | — | — | — |
|  | sPB-3 | — | — | — | — | — | — |
|  | sPB-4 | — | — | — | — | — | — |
|  | sPB-5 | 20 | — | — | — | — | — |
|  | sPB-6 | — | 20 | — | — | — | — |
|  | sPB-7 | — | — | 20 | — | — | — |
|  | sPB-8 | — | — | — | 20 | 10 | 30 |
|  | Carbon black *1 | 39 | 39 | 39 | 39 | 39 | 39 |
|  | Stearic acid | 2 | 2 | 2 | 2 | 2 | 2 |
|  | Wax *2 | 2 | 2 | 2 | 2 | 2 | 2 |
|  | Age resistor 6C *3 | 1 | 1 | 1 | 1 | 1 | 1 |
|  | ZnO | 3.0 | 3.0 | 3.0 | 3.0 | 3.0 | 3.0 |
|  | Sulfur | 1.3 | 1.3 | 1.3 | 1.3 | 1.3 | 1.3 |
|  | Age resistor TMQ *4 | 0.3 | 0.3 | 0.3 | 0.3 | 0.3 | 0.3 |
|  | Vulcanization accelerator *5 | 0.8 | 0.8 | 0.8 | 0.8 | 0.8 | 0.8 |
| Evaluation | Fuel efficiency | 120 | 128 | 124 | 124 | 118 | 137 |
|  | Wear resistance | 87 | 67 | 71 | 73 | 87 | 74 |
|  | Cutting resistance | 129 | 120 | 135 | 124 | 111 | 140 |
|  | Balance between wear resistance and fuel efficiency | 116 | 103 | 101 | 104 | 113 | 136 |
|  | Balance between cutting resistance and fuel efficiency | 131 | 163 | 176 | 161 | 135 | 218 |

*1 Carbon black: ISAF grade carbon black, "Asahi #80" manufactured by Asahi Carbon Co., Ltd.
*2 Wax: microcrystalline wax, manufactured by Seiko-Chemical Co., Ltd.
*3 Age resistor 6C: N-(1,3-dimethylbutyl)-N'-phenyl-p-phenylenediamine, "NOCRAC ® (NOCRAC is a registered trademark in Japan, other countries, or both) 6C" manufactured by Ouchi Shinko Chemical Industrial Co., Ltd.
*4 Age resistor TMQ: 2,2,4-trimethyl-1,2-dihydroquinoline polymer, "NOCRAC ® 224" manufactured by Ouchi Shinko Chemical Industrial Co., Ltd.
*5 Vulcanization accelerator: 1,3-diphenylguanidine, "NOCCELER ® (NOCCELER is a registered trademark in Japan, other countries, or both) D" manufactured by Ouchi Shinko Kagaku Kogyo Co., Ltd.

Example 2

Example 2 used the following as syndiotactic 1,2-polybutadiene-9 (hereinafter, may be abbreviated as "SPB-9") and syndiotactic 1,2-polybutadiene-10 (hereinafter, may be abbreviated as "SPB-10").

(sPB-9)

The sPB-9 was "JSR RBR 840" manufactured by JSR Corporation. The sPB-1 had a 1,2-bond content of 84 mass %, a melting point of 122° C., a number-average molecular weight of 66000, and a crystal content of 21 J/g.

(Production of sPB-10)

A 1 L (1000 CC)-glass bottle that had been dried in an oven was plugged with a rubber liner for sealing and a metal cap with a hole. After the bottle was completely purged with dry nitrogen gas, 94 g of hexanes and 206 g of a mixture of 1,3-butadiene/hexanes containing 21.8 mass % of 1,3-butadiene were added to the bottle. Next, the following catalyst components (i) to (iii) were added to the bottle in the following order.

(i) 2-ethylhexanoate iron (III) 0.045 mmol
(ii) 2-oxo-(2H)-5-butyl-5-ethyl-1,3,2-dioxaphosphorinan 0.18 mmol
(iii) triisobutylaluminum 0.59 mmol The bottle was stirred for 3 hours in a water bath maintained at 80° C. The resulting polymerization reaction mixture was a fluid and slightly turbid solution. The fluidity of the solution disappeared with the precipitation of syndiotactic 1,2-polybutadiene, which occurred immediately after cooling to room temperature. The polymerization reaction mixture was aggregated with 3 liters of isopropanol containing 2,6-di-tert-butyl-4-methylphenol as an antioxidant. The resulting solid content was isolated by filtration and dried under reduced pressure at 60° C. to a constant weight.

The yield of the resulting sPB-2 was 41.1 g (yield 91%), and the melting point (melting peak temperature measured by differential scanning calorimetry) was 136° C. As a result of analyzing the sPB-2 by 1H and 13C nuclear magnetic resonance (NMR), the 1,2-bond content was 82%, and the syndiotacticity in the 1,2-bond was 78%. Further, the weight-average molecular weight of the sPB-2 was 400000, the crystallinity was 33%, and the crystal content was 19 J/g.

The melting point and crystal content of the sPB-9 and the sPB-10 were measured with the same method as in Example 1.

The weight-average molecular weight (Mw), 1,2-bond content, syndiotacticity in 1,2-bond, and crystallinity of the sPB-9 and sPB-10 were measured with the following methods.

(Weight-Average Molecular Weight (Mw))

It was measured by gel permeation chromatography [GPC: HLC-8220/HT manufactured by Tosoh] using a differential refractometer as a detector, and a polystyrene-equivalent weight-average molecular weight was indicated with monodisperse polystyrene as a standard. The column was GMHHR-H(S)HT [manufactured by Tosoh], the eluent was trichlorobenzene, and the measurement temperature was 140° C.

(1,2-Bond Content of Butadiene, and Syndiotacticity in 1,2-Bond)

They were determined by $^1H$ and $^{13}C$ nuclear magnetic resonance (NMR) analysis of the syndiotactic 1,2-polybutadiene.

(Crystallinity)

It was calculated in terms of the density measured with the underwater substitution method, with the density of 1,2-polybutadiene with a crystallinity of 0% being 0.889 g/cm$^3$, and the density of 1,2-polybutadiene with a crystallinity of 100% being 0.963 g/cm$^3$.

<Samples 2-1 to 2-9>

A non-production kneading process was performed with the composition listed in Table 1. The kneading temperature was 160° C. Next, the components listed in Table 1 were added to the masterbatch obtained from the non-production kneading process, and a production vulcanization process was performed to obtain a vulcanized rubber composition. The temperature during vulcanization is listed in Table 1.

The low heat generating properties and the cutting resistance of each sample of the obtained vulcanized rubber composition were evaluated with the following methods. The results are listed in Table 1.

(1) Low Heat Generation Property

The tangent loss tan δ of each sample of vulcanized rubber composition was measured under conditions of frequency of 15 Hz, tensile strain of 2%, and a temperature of 24° C. using a viscoelasticity meter (manufactured by Ueshima Seisakusho Co., Ltd.).

The evaluation was indicated as an index obtained by taking the reciprocal of the measured value of tan δ and taking the reciprocal of Sample 2-1 as 100. The larger the index value is, the smaller the tan δ is, the better the low heat generation properties are.

(2) Cutting Resistance,

A test was conducted in which a pure shear-type test piece was cut while being stretched, and the growth of the crack was observed using a tensile test device (Shimadzu Corporation), and the energy release rate (transfer energy) at which the crack growth rate increases discontinuously was measured. The evaluation was indicated as an index obtained by taking the transfer energy of the sample of Sample 2-1 as 100. The larger the value is, the better the cutting resistance is.

TABLE 3

| | | 2-1 Comparative Example | 2-2 Comparative Example | 2-3 Comparative Example | 2-4 Example | 2-5 Example | 2-6 Example | 2-7 Example | 2-8 Example | 2-9 Example |
|---|---|---|---|---|---|---|---|---|---|---|
| Chemical composition of rubber composition | Natural rubber | 100 | 100 | 100 | 80 | 80 | 80 | 80 | 80 | — |
| | sPB-9 | — | — | — | 20 | 20 | 20 | — | — | — |
| | sPB-10 | — | — | — | — | — | — | 20 | 20 | 20 |
| | Carbon black *11 | 50.0 | 40 | 40 | 40 | 40 | 40 | 40 | 40 | 40 |
| | Stearic acid | 2.00 | 2.00 | 2.00 | 2.00 | 2.00 | 2.00 | 2.00 | 2.00 | 2.00 |
| | Wax *12 | 2.00 | 2.00 | 2.00 | 2.00 | 2.00 | 2.00 | 2.00 | 2.00 | 2.00 |
| | Zinc oxide | 3.00 | 3.00 | 3.00 | 3.00 | 3.00 | 3.00 | 3.00 | 3.00 | 3.00 |
| | Sulfur | 1.30 | 1.30 | 1.69 | 1.30 | 1.30 | 1.30 | 1.30 | 1.30 | 1.30 |
| | Age resistor 6C *13 | 1.00 | 1.00 | 1.00 | 1.00 | 1.00 | 1.00 | 1.00 | 1.00 | 1.00 |

TABLE 3-continued

|  |  | 2-1 Comparative Example | 2-2 Comparative Example | 2-3 Comparative Example | 2-4 Example | 2-5 Example | 2-6 Example | 2-7 Example | 2-8 Example | 2-9 Example |
|---|---|---|---|---|---|---|---|---|---|---|
|  | Age resistor TMQ *14 | 0.30 | 0.30 | 0.3 | 0.30 | 0.30 | 0.30 | 0.30 | 0.30 | 0.30 |
|  | Vulcanization accelerator *15 | 0.80 | 0.80 | 1.04 | 0.80 | 0.80 | 0.80 | 0.80 | 0.80 | 0.80 |
| Vulcanization temperature | | 150 | 150 | 150 | 120 | 150 | 165 | 120 | 150 | 165 |
| Physical property of vulcanized rubber | M25(Mpa) | 0.71 | 0.55 | 0.64 | 1.27 | 1.28 | 1.23 | 1.63 | 1.45 | 1.38 |
| | M300(Mpa) | 9.38 | 6.77 | 8.66 | 9.54 | 8.87 | 8.72 | 14.39 | 11.11 | 10.02 |
| | M400(Mpa) | 15.23 | 11.81 | 14.75 | 14.51 | 13.34 | 13.12 | 20.48 | 16.72 | 14.93 |
| | M25*M300/ (M400 − M300)$^2$ | 0.195 | 0.146 | 0.149 | 0.491 | 0.565 | 0.555 | 0.635 | 0.511 | 0.572 |
| | M400 − M300(MPa) | 5.85 | 5.04 | 6.10 | 4.97 | 4.48 | 4.40 | 6.09 | 5.61 | 4.91 |
| Evaluation | Low heat generation property (index) | 100 | 138 | 141 | 119 | 118 | 112 | 100 | 104 | 107 |
| | Cutting resistance (index) | 100 | 86 | 74 | 116 | 115 | 116 | 116 | 111 | 107 |

*11 Carbon black: ISAF grade carbon black, "Asahi #80" manufactured by Asahi Carbon Co., Ltd.
*12 Wax: microcrystalline wax, manufactured by Seiko-Chemical Co., Ltd.
*13 Age resistor 6C: N-(1,3-dimethylbutyl)-N'-phenyl-p-phenylenediamine, "NOCRAC ® 6C" manufactured by Ouchi Shinko Chemical Industrial Co., Ltd.
*14 Age resistor TMQ: 2,2,4-trimethyl-1,2-dihydroquinoline polymer, "NOCRAC ® 224" manufactured by Ouchi Shinko Chemical Industrial Co., Ltd.
*15 Vulcanization accelerator: N-(cyclohexyl)-2-benzothiazolesulfenamide, "NOCCELER ® CZ" manufactured by Ouchi Shinko Kagaku Kogyo Co., Ltd.

From Table 2, it is understood that the vulcanized rubber compositions of Examples of the present disclosure are excellent in both the balance between fuel efficiency and wear resistance and the balance between fuel efficiency and cutting resistance.

(Effect of Molecular Weight)

The effect caused by the difference in number-average molecular weight was examined based on the results of SPB-1, 2, 8, 4, and 6 (Examples 3, 4, 10, 6, and 8 in Table 2, respectively) in which the crystal contents are relatively close. From the results in Table 2, the balance between wear resistance and fuel efficiency of the example group having a large number-average molecular weight (SPB-8, 4, and 6, which are 10, 6, and 8 in Table 2, respectively) is better than that of the example group having a small number-average molecular weight (SPB-1 and 2, which are Examples 3 and 4 in Table 2, respectively).

(Effect of Crystal Content)

The effect caused by the difference in crystal content was examined based on the results of SPB-3, 4, 6, 8, and 5 (Comparative Example 5, and Examples 6, 8, 10, and 7 in Table 2, respectively) in which the number-average molecular weights are relatively close. Note that, although the number-average molecular weight of SPB-7 (Example 9 in Table 2) is close to SPB-3, 4, 6, 8, and 5, it is considered that no double network is formed, as will be described later. Therefore, SPB-3, 4, 6, 8, and 5, which form the double network, are not included in the comparison in terms of the effect of crystal content in this column.

From the results in Table 2, it is understood that the value of the balance between wear resistance and fuel efficiency increases in the order of SPB-3 (Comparative Example 5 in Table 2) with a small crystal content; SPB-4, 6, and 8 (Examples 6, 8, and 10 in Table 2) with a large crystal content; and SPB-5 (Example 7 in Table 2) with a larger crystal content.

(About Example 9 Using SPB-7)

In Example 9 which used SPB-7, vulcanization was performed at a temperature of 13° C. lower than the melting point of the SPB. It can be understood that, although no double network was formed or only a part of the double network was formed, it had excellent cutting resistance.

Further, from the results in Table 3, it can be seen that the sample of the vulcanized rubber composition of the present disclosure has specific physical properties of vulcanized rubber and is excellent in both low heat generating properties and cutting resistance. The samples of Examples in particular showed better cutting resistance than all Comparative Examples, and it can be inferred that it is the result of forming the double network in the vulcanized rubber composition.

INDUSTRIAL APPLICABILITY

According to the present disclosure, it is possible to provide a rubber composition that can improve wear resistance and cutting resistance while having good fuel efficiency when applied to a tire. Further, according to the present disclosure, it is possible to provide a tire having excellent fuel efficiency, wear resistance and cutting resistance.

The invention claimed is:

1. A rubber composition, comprising a rubber component containing either or both of natural rubber and synthetic isoprene rubber, and syndiotactic 1,2-polybutadiene, wherein
the syndiotactic 1,2-polybutadiene has a crystal content of 7 J/g to 40 J/g and a number-average molecular weight of $6.5 \times 10^4$ or more,
wherein, after vulcanization, a modulus value at 25% elongation, which is indicated as M25, a modulus value at 300% elongation, which is indicated as M300, and a modulus value at 400% elongation, which is indicated as M400, of the rubber composition satisfy the following relational expressions (1) and (2), $$M400 - M300 \leq 5.80 \quad (1)$$

$$M25 \times M300/(M400 - M300)^2 > 0.39 \quad (2).$$

2. The rubber composition according to claim 1, wherein the syndiotactic 1,2-polybutadiene has a crystal content of 15 J/g to 40 J/g and a number-average molecular weight of $8.9 \times 10^4$ or more.

3. The rubber composition according to claim 2, wherein the syndiotactic 1,2-polybutadiene has a crystal content of 17 J/g to 40 J/g and a number-average molecular weight of $17.9 \times 10^4$ or more.

4. The rubber composition according to claim 3, wherein the syndiotactic 1,2-polybutadiene has a crystal content of 17 J/g to 31 J/g and a number-average molecular weight of $17.9 \times 10^4$ to $34.7 \times 10^4$.

5. The rubber composition according to claim 1, wherein a content of the syndiotactic 1,2-polybutadiene is 10 parts by mass to 30 parts by mass with respect to 100 parts by mass of the rubber component.

6. The rubber composition according to claim 1, wherein the syndiotactic 1,2-polybutadiene has a melting point of 100° C. to 180° C.

7. The rubber composition according to claim 1, wherein the syndiotactic 1,2-polybutadiene has a 1,2-bond content of 80 mass % or more.

8. The rubber composition according to claim 1, further comprising a filler.

9. The rubber composition according to claim 8, wherein the filler contains at least carbon black.

10. The rubber composition according to claim 9, wherein a content of the carbon black is 10 parts by mass to 70 parts by mass with respect to 100 parts by mass of the rubber component.

11. The rubber composition according to claim 1, wherein, after vulcanization, the M25, M300 and M400 satisfy the following relational expression (3), $$M25/(M400-M300)^2 > 0.04 \tag{3}$$

12. A tire, using the rubber composition according to claim 1.

13. The tire according to claim 12, wherein the rubber composition is used in at least a member of a tread portion that is in contact with a road surface.

14. The rubber composition according to claim 2, wherein a content of the syndiotactic 1,2-polybutadiene is 10 parts by mass to 30 parts by mass with respect to 100 parts by mass of the rubber component.

15. The rubber composition according to claim 2, wherein the syndiotactic 1,2-polybutadiene has a melting point of 100° C. to 180° C.

16. The rubber composition according to claim 2, wherein the syndiotactic 1,2-polybutadiene has a 1,2-bond content of 80 mass % or more.

17. The rubber composition according to claim 2, further comprising a filler.

18. The rubber composition according to claim 17, wherein the filler contains at least carbon black.

19. The rubber composition according to claim 18, wherein a content of the carbon black is 10 parts by mass to 70 parts by mass with respect to 100 parts by mass of the rubber component.

* * * * *